United States Patent [19]

Palum

[11] Patent Number: 5,335,091
[45] Date of Patent: Aug. 2, 1994

[54] APPARATUS FOR MECHANICALLY DITHERING A CCD ARRAY

[75] Inventor: Russell J. Palum, Rochester, N.Y.

[73] Assignee: Eastman Kodak Company, Rochester, N.Y.

[21] Appl. No.: 815,479

[22] Filed: Dec. 31, 1991

[51] Int. Cl.$^5$ .................. H04N 1/028; H04N 3/10
[52] U.S. Cl. .................... 358/474; 358/296; 359/212
[58] Field of Search ............ 358/474, 449, 296, 199, 358/498, 500, 285, 213.28, 212, 293, 505, 408, 406, 486, 453; 198/345.1; 250/548, 237 G, 557; 356/358, 363, 237, 400, 401, 375; 359/212, 213, 223

[56] References Cited

U.S. PATENT DOCUMENTS

| | | | |
|---|---|---|---|
| 4,185,298 | 1/1980 | Billet et al. | 358/106 |
| 4,219,850 | 8/1980 | Howard | 358/285 |
| 4,517,603 | 5/1985 | Epsztein et al. | 358/213 |
| 4,554,586 | 11/1985 | Tanuma et al. | 358/213 |
| 4,581,649 | 4/1986 | Morokawa | 358/212 |
| 4,607,287 | 8/1986 | Endo et al. | 358/213 |
| 4,633,317 | 12/1986 | Uwira et al. | 358/213 |
| 4,652,928 | 3/1987 | Endo et al. | 358/213 |
| 4,676,637 | 6/1987 | Uto et al. | 356/237 |
| 4,755,876 | 7/1988 | Dangler | 358/264 |
| 4,947,239 | 8/1990 | Kondou et al. | 357/74 |
| 5,097,354 | 3/1992 | Goto | 359/212 |
| 5,114,234 | 5/1992 | Otsuka et al. | 356/358 |
| 5,148,600 | 9/1992 | Chen et al. | 33/1 M |
| 5,157,504 | 10/1992 | Shirishi et al. | 358/296 |
| 5,200,849 | 1/1992 | Inagaki et al. | 359/196 |

FOREIGN PATENT DOCUMENTS

0277675  1/1988  European Pat. Off. .
9109236 10/1991  Fed. Rep. of Germany .

*Primary Examiner*—Paul Ip
*Attorney, Agent, or Firm*—Philip E. Hansen; Charles E. Snee, III

[57] ABSTRACT

An apparatus for imparting a controlled relative displacement of two parallel surfaces along a single axis or along two orthogonal axes is disclosed. Controlled displacement along any axes, orthogonal or otherwise, may be obtained by stacking appropriately oriented single-axis units. The apparatus uses a force-generating means and connecting beams acting in concert to produce a relative displacement of two rigid parallel frames. An imaging means is mounted on one rigid frame and a photosensitive matrix on the other to provide an electro-optical detector system in which the image field may be periodically displaced along a closed trajectory to cover the interstices between the detector elements of the photosensitive matrix. A method for the use of the apparatus to generate electronic picture information is also disclosed.

19 Claims, 7 Drawing Sheets

PIXEL PITCH    PIXEL WIDTH

APPARATUS FOR MECHANICALLY DITHERING A CCD ARRAY

BACKGROUND OF THE INVENTION

1. Field of the Invention

The invention relates to an apparatus for imparting a controlled relative displacement of two parallel surfaces along a single axis or along two orthogonal axes. The apparatus uses a force-generating means and connecting beams acting in concert to produce a relative displacement of two rigid parallel frames. An imaging means is mounted on one rigid frame and a photosensitive matrix on the other to provide an electro-optical detector system in which the image field may be periodically displaced along a closed trajectory to cover the interstices between the detector elements of the photosensitive matrix. The invention also relates to a method for the use of the apparatus to generate electronic picture information.

2. Information Disclosure

Electronic imaging systems employing solid state image sensors or charge coupled device (CCD) arrays are used to produce standard video resolution (512×512 pixel) as well as higher resolution images. Image sensors are utilized in television cameras and other electro-optic systems to convert a visual presentation on the sensor's surface into a serial pulse train of electrical signals. The pulse train is then processed and conditioned for whatever purpose is to be made of information contained therein. When the CCD is used for image reproduction as part of an electro-optical depiction system it is placed in the focal plane of an optic system comprised of lenses, colimators, etc. Multiplexers associated with the component CCD's convert the image sensed in a focal plane to a train of pulses, the amplitude of which is directly proportional to the intensity of illumination occurring at each photo site or pixel of the sensors.

Silver halide photographic images can be captured with an acceptable loss in resolution if an array with at least 2000×3000 pixels is used. A 4000×6000 pixel array is probably closer to optimum. At present, the largest arrays contain about four million pixels in a 2000×2000 array. At this density the arrays are very expensive and still do not produce images with silver halide photographic resolution. If the number of pixels is simply increased in a CCD to satisfy the need for high integration, the chip size is increased. If the number of pixels is increased and their size decreased in order to increase the number of pixels without changing the chip size, the integration of pixels must be greatly enhanced. In this case it is technically difficult to prepare the high density CCD and even if fabrication techniques allow the manufacture of such a CCD, the circuit configuration becomes complicated and the power consumption becomes high, giving rise to new problems.

Figure 1:
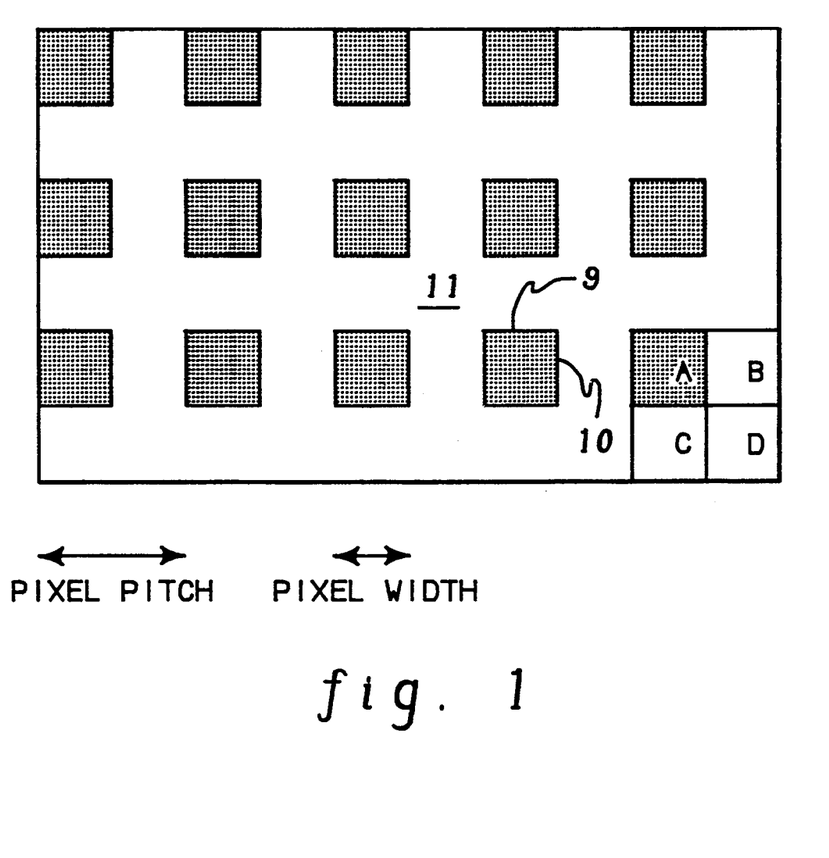
FIG. 1 is a schematic representation of a portion of a sparse array CCD, showing active and inactive areas.

In order to address the problem of the number of pixels versus packing density, the CCD may be periodically displaced (dithered) relative to incident image light thereby allowing each pixel to capture information on several adjacent segments of the image. In this fashion a low resolution array can be used to produce high resolution images. The CCD is configured as a sparse array and the image is scanned over the array as disclosed, for example in U.S. Pat. No. 4,633,317 (Uwira et al.). An example of a sparse array is shown in FIG. 1 discussed below. The small dark squares represent the pixel active area and the remaining space is inactive. The value G is the ratio of the active width to the pixel pitch and need not be the same on both axes. If G is 0.5 on both axes, then a 1000×1500 array can be used to produce the same resolution as a 2000×3000 array. To capture an image, the image and array have to be moved relative to each other so that each quadrant of the area defined by the horizontal and vertical pixel pitch fall on the active quadrant as shown in the bottom right pixel in FIG. 1. The art discloses methods for moving an image relative to a CCD array.

U.S. Pat. No. 4,517,603 (Epsztein and Guyot) discloses a device for producing televised pictures with a high degree of resolution. The device comprises a photosensitive matrix which receives an optical image and an electromechanical apparatus for displacing the matrix with respect to the image. The displacement is equal to half the size of the pixel. In the construction of the device, the photosensitive matrix is surrounded by a mechanical support guided by members which also act as end of travel stops for limiting the total displacement of the matrix to a half line. The support is subject to a restoring force supplied by springs whose rigidity must be such that the matrix displacement takes place in less than about 2 microseconds. The support is subject to an exciting force supplied by a moving coil immersed in a radial magnetic field and controlled by a square signal generator.

U.S. Pat. No. 4,554,586 (Tanuma et al.) discloses a solid state image sensing device which includes a base board fitted with a CCD serving as an area sensor and a pair of bimorph piezoelectric vibrating elements which jointly vibrate the CCD relative to an incoming image in a plane substantially parallel with the surface of the base board. The piezoelectric vibrating elements are elastically held above the base board by supporting plates having a spring action.

U.S. Pat. No. 4,581,649 (Morokawa) discloses an pickup system which has an image sensor including a plurality of photodetectors arranged in two dimensions and an optical system having a lens for forming an image on the image sensor. A vibrator is provided for vibrating the image on the image sensor so as to oscillate the picture data and a scanner is provided to be operative in synchrony with the vibration of the image to change the oscillated picture data to data for a fixed image. The vibrator comprises a pair of piezoelectric vibrator elements disposed on both sides of the support plate which is supported on a support. A counterbalance is secured to an electrode of the vibrator element so that when both vibrator elements are driven by a signal from a driving signal source, the image sensor and balance are reciprocated and the vibration of the system is canceled.

U.S. Pat. No. 4,607,287 (Endo et al.) discloses a solid-state image sensing device in which a CCD is coupled to fixed bimorph piezoelectric vibrators by which it is given a wobbling-swing drive during image pickup. This wobbling-swing drive is controlled by a controller which provides two vibrations: a swing vibration and a wobble vibration superimposed on the swing vibration so that the pickup operation is performed at each sampling position while wobbling when each pixel is positioned in each field.

U.S. Pat. No. 4,633,317 (Uwira et al.) discloses a high resolution electro-optical detector system incorporating a mosaic CCD. The image of the field is periodically displaced along a closed trajectory cover the interstices between the detector elements of the mosaic detector. The image is moved relative to a stationary mosaic detector. Each image element performs a movement clockwise along a closed circular trajectory. The image is rotated by means of a plane mirror which is supported on three piezoelements. The mirror carries out a uniform rotating motion when three alternating voltages mutually displaced in phase by 120° are supplied to the three piezoelements which are angularly spaced by 120°.

U.S. Pat. No. 4,652,928 (Endo et al.) discloses a solid state image sensing system which includes a CCD and a vibration table. The vibration table moves the CCD in such a manner that it is vibrated in a horizontal direction in one vibration cycle consisting of two succeeding frame periods each having two fields. The CCD is fixed to the rear side of a vibration table opposite its image pickup side which faces a lens. The table comprises a bimorph piezoelectric element and vibrates in a cycle of two frame periods under a predetermined complicated vibration mode in response to a swing drive signal.

U.S. Pat. No. 4,755,876 (Dangler) discloses an image scanner which utilizes a dither plate to steer an image onto a sparsely-populated image sensor. A DC motor, which is responsive to a servo control is used to position the dither plate relative to the sensor. The position of the dither plate is sensed by a linear proximity sensor which is part of a closed-loop servo control for the motor.

U.S. Pat. No. 4,947,239 (Kondou and Ono) discloses a swing-driven solid state imaging device which has a CCD image sensor, a stacking piezoelectric element and a package structure. The piezoelectric element serves as an actuator for vibrating the image sensor in a plane substantially perpendicular to the image.

In the devices of the art (Tanuma, Morokawa, Endo, Iwira, Endo II and Kondou) piezoelectric actuators (PZT) are used to scan a CCD array through one pixel pitch so that a sparse array can be used to capture an image. Drift, which leads to unreliable positioning of the array, is one of the drawbacks of PZT's and PZT power supplies tend to be complicated. Moreover piezoelectric drive elements are expensive and are therefore not commercially suitable in situations where expense is a critical factor. Magnetic displacement of the CCD platform (Epsztein) using a platform with a small spring constant leads to overshoot and oscillation after displacement. A wedged rotating plate with servo motor control (Dangler) has also been used but this technique is expensive to implement.

There is thus a need for a robust mechanical system that is both precise and inexpensive.

SUMMARY OF THE INVENTION

It is an object of the invention to provide a rugged device to impart controlled relative displacement of two parallel surfaces for the purpose of capturing a higher resolution image on a lower resolution CCD array.

It is a further object to provide a displacement system that utilizes simple mechanical principles to achieve high reliability and precision.

It is a further object to provide an apparatus that can be inexpensively fabricated.

The invention provides a durable, inexpensive, and easily manufactured displacing apparatus by allowing the use of drive solenoids to impart controlled relative displacement of two frames one of which carries an image source and the other a CCD array.

In one aspect, the invention relates to an apparatus for imparting a controlled relative displacement of two parallel surfaces in an electro-optical detector system comprising:

(a) first and second rigid frames having opposing parallel faces, wherein said parallel face of said first rigid frame carries one of an image source and a photosensitive matrix and said opposing parallel face of said second rigid frame carries the other of said image source and said photosensitive matrix;

(b) a plurality of parallel connecting beams connecting said first and second rigid frames, the ends of said beams being fixedly attached to said frames, said beams having a stiffness such that the natural frequency of oscillation of a system comprising said beams and said frames is greater than 200 cps;

(c) a force-transferring beam or two such beams substantially parallel to said connecting beams having a first end fixedly attached to said first rigid frame, said force transferring beams having a smaller stiffness than the sum of the stiffness of said connecting beams; and (d) means for applying sufficient force to said second end of said force-transferring beams to cause a displacement of said second ends from a position of rest, said means fixedly attached to said second rigid frame and engaging a second end of said force-transferring beams wherein the resistance to deflection of said force-transferring beam and said connecting beams act in concert to produce a relative displacement of said first and second rigid frames substantially along a single axis or along two orthogonal axes.

A preferred embodiment of this aspect comprises two parallel connecting beams, one force-transferring beam, and one solenoid to provide displacement along one axis. A more preferred embodiment employs four connecting beams, two force-transferring beams and two solenoids to provide displacement substantially two orthogonal axes. In both embodiments an image source, preferably a lens, is located on one of the frames and a photosensitive matrix, preferably a CCD array, is located on the other. The force-applying means is preferably a solenoid or a cam; the travel of the solenoid or cam is optionally limited by a mechanical stop.

In another, related aspect, the invention relates to an apparatus as described above, but lacking the force-transferring beam or beams. In this aspect, the displacing force is applied directly to one rigid frame by a solenoid or pair of orthogonal solenoids rigidly mounted on the other frame. The interaction of the force supplied by the solenoid and the resistance offered by the connecting beams provides a controlled, relative displacement along one axis or two orthogonal axes.

The invention further relates to a method for the generation of electronic picture information, comprising:

(a) providing a charge-coupled detector having a plurality of rectangular detector elements having first and second sides, said detector elements being arranged in columns parallel to said first sides and rows parallel to said second sides. The detector elements of each of said columns define first interstices therebetween, the widths of which are preferably substantially equal to the lengths of said first sides. The detector elements of each of said rows also define second interstices therebetween, the widths of which are preferably substantially equal to the length of said second sides.

(b) providing imaging means for forming an image of a field of view on the detector whereby each of the detector elements provides picture information;

(c) providing an apparatus as described above for displacing the image relative to the detector; and (d) displacing the image such that, at some point during each cycle, each point of the image that has fallen on an interstice is directed onto a detector element. Preferably this is accomplished by displacing the image along a closed rectangular trajectory, said apparatus displacing each point of the image relative to the detector, during each cycle, from one corner of a rectangle, to an adjacent corner of a rectangle the sides of which are equal in length and parallel to the first and second sides of the detector elements.

In a preferred embodiment the CCD is mounted on the second rigid frame, the imaging means, preferably a lens, is mounted on the first rigid frame, the two are rectangular and are connected by four parallel connecting beams fixedly attached at the four corners of the rectangular frames, and the means for applying force are two solenoids mounted orthogonally on the second frame acting on two force-transferring beams fixedly attached at orthogonal edges of the first frame or acting directly on orthogonal faces of the first frame. The magnitude of the displacement of the force-transferring beams by the solenoids may be controlled either by the amount of current applied to the solenoids or by mechanical stops mounted on the second frame.

DESCRIPTION OF PREFERRED EMBODIMENTS

As discussed above, a lower resolution CCD array can be used to produce high resolution images if it is configured as a sparse array and the image is scanned over the array. In FIG. 1 the shaded squares A represent a plurality of rectangular detector elements or pixels in a CCD array. Each detector element has a first side 9 and a second side 10. The repeat distance between corresponding sides of adjacent pixels is referred to as the pixel pitch. Between the elements are interstices B, C, and D, which are inactive in image detection. The width and height of the interstices in this embodiment are equal in length to the sides of the detector elements. Thus, in this case, the pixel width is one-half the pixel pitch in both dimensions. To capture an image, the image and the array have to be moved relative to each other so that each quadrant of the area defined by the horizontal and vertical pixel pitch fall on the active quadrant as shown in the bottom right pixel in FIG. 1. The array can be moved relative to the image source or the image source can be moved relative to the array. Each of four intensities, a, b, c and d, are stored in memory so that the stored information spacially corresponds to original image based on the chosen memory organization. This technique can be modified by making the pixel smaller than one-half of the pitch and increasing the number of steps by a corresponding proportion. It is also possible to use contiguous pixels on one axis and to scan the image on the remaining axis; this is an extension of the common technique of scanning an image over a linear array.

Figure 2:
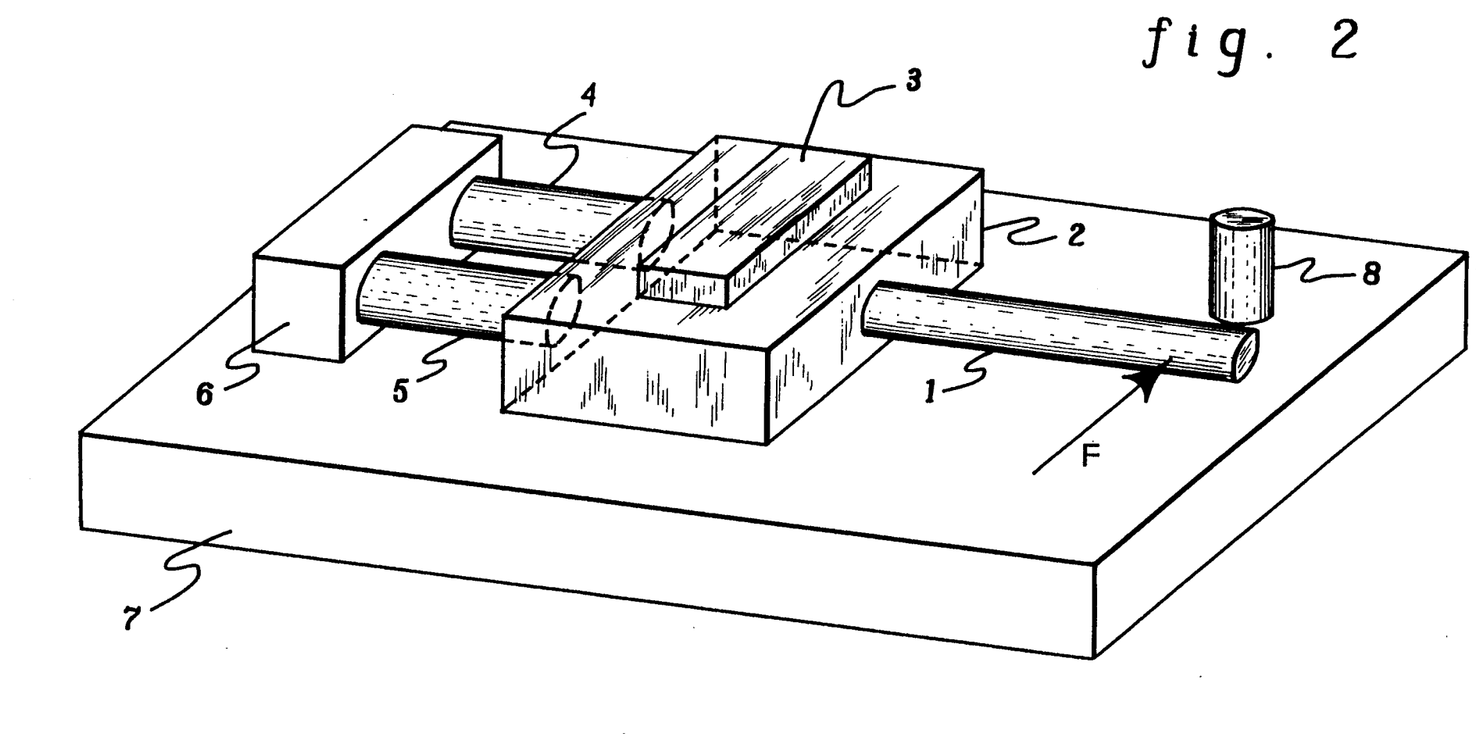
FIG. 2 is an oblique view of a simple device of the invention that produces displacement along a single axis.

One technique of the invention for moving the array relative to the image uses a plurality of connecting beams between two rigid frames or stages and an additional weaker displacement beam (or force-transferring beam) that is moved a relatively larger distance to displace the connecting beams a small distance. The ratio of displacement beam motion to the stage motion is the ratio of the stiffness of the beams. Stiffness is defined as load deflection. The connecting beams can be chosen to be as much as 1,000 times or more as stiff as the beam used to apply the displacement force so that the displacing beam must be moved 1,000 times the desired stage movement. A simple device embodying this principle is shown in FIG. 2. A force E is applied at some point along a force-transferring beam 1 which acts on a stage 2 carrying in this illustration a CCD 3. The movement of the stage in response to the force is resisted by connecting beams 4 and 5 which are fixedly attached to both the stage 2 and the platform 7 by way of an extension 6 of platform 7. The displacement of the stage 2 can be calculated by simple physical principles knowing the effective the Young's moduli, and the cross-sectional areas of the beams 1, 4 and 5. In the example of FIG. 2, a stop 8 determines the displacement of beam 1 and thereby of stage 2. The force may be exerted by a solenoid urging beam 1 against the stop 8 or alternatively the force may be supplied by a solenoid simply displacing the beam proportional to the current applied to the solenoid. If desired, the force may be applied by a cam, in which case travel will be determined by the eccentricity of the cam. Using beam stiffness to control the movement of the stage 2 can be implemented very inexpensively compared to the alternatives of using a tipped rotating plate or piezoelectric actuators. The technique is sufficiently accurate without feedback but it is possible to add feedback if desired.

Figure 3:
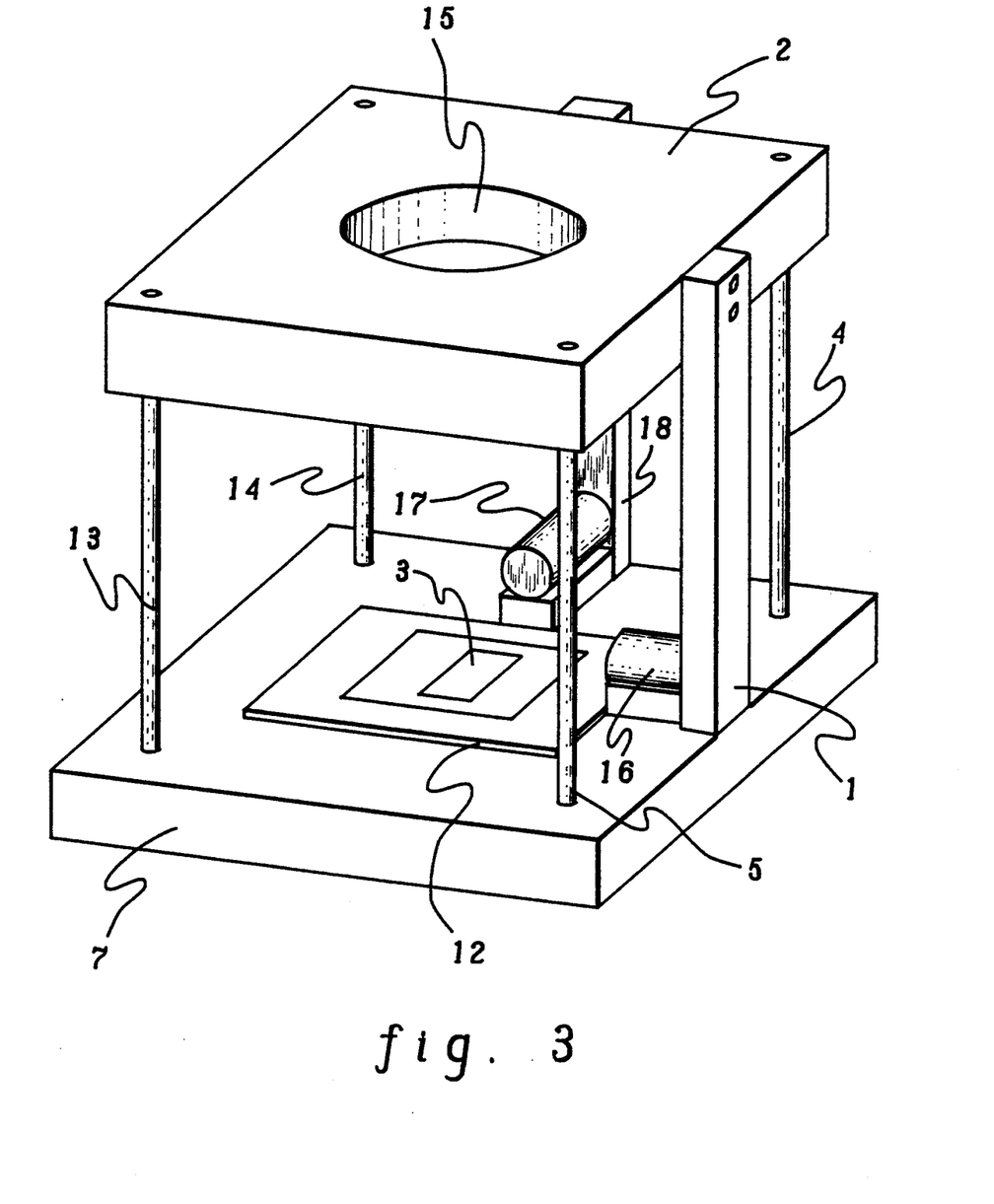
FIG. 3 is an oblique view of a compact device of the invention that produces displacement along two orthogon axes.

FIG. 3 illustrates a compact device of the invention embodying the same principles as were evident in the simpler diagram of FIG. 2 but now providing displacement along two orthogonal axes. In the device of FIG. 3 a lens 15 is provided in rigid frame 2 and the CCD 3 is held in a stage or on a circuit board 12 on rigid frame 7. Force is applied to force-transferring beam 1 by solenoid 16 which is mounted on rigid frame 7. The rigid frame 7 has an upper parallel face which is connected to the lower parallel face of rigid frame 2 by four connecting beams 4, 5, 13 and 14. Force is applied to force-transferring beam 18 by solenoid 17. The activation of solenoid 16 provides a displacement of the rigid frame 2 along the x axis and the activation of solenoid 17 provides a displacement along the y axis.

Figure 4:
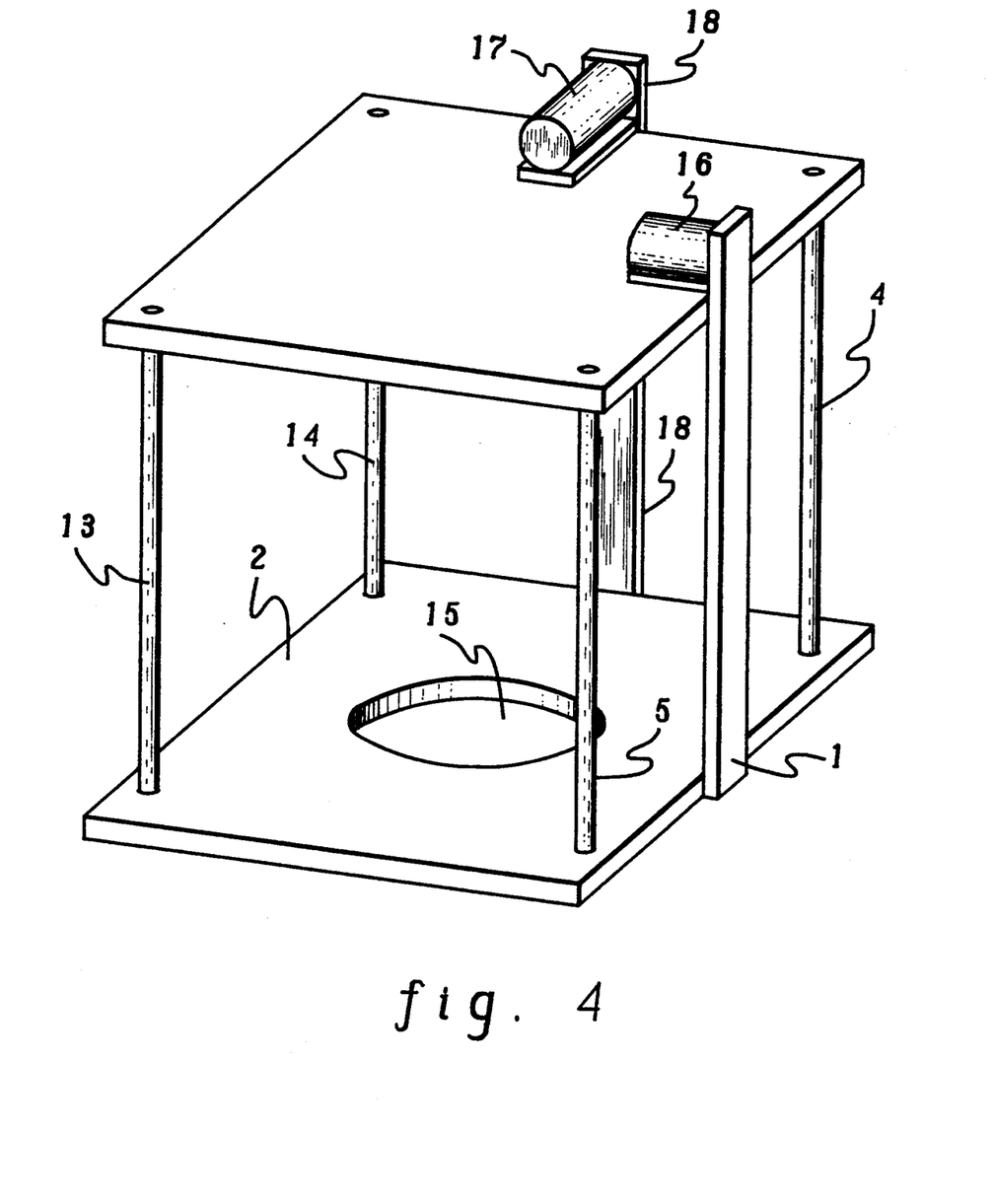
FIG. 4 is an oblique view of an embodiment of the invention, similar to that of FIG. 3 but having several elements alternatively located.

FIG. 4 shows another embodiment of a device according to the invention wherein the lens 15 is mounted in the rigid frame 2 and the CCD (not visible) is mounted on the underside of rigid frame 7. Frames 2 and 7 are connected by connecting beams 4, 5, 13 and 14 which are fixedly mounted in the frames. The displacement of frame 2 relative to frame 7 is effected in the x axis by the action of solenoid 16 on force-transferring beam 1 and in the y axis by the action of solenoid 17 on force-transferring beam 18.

Figure 5:
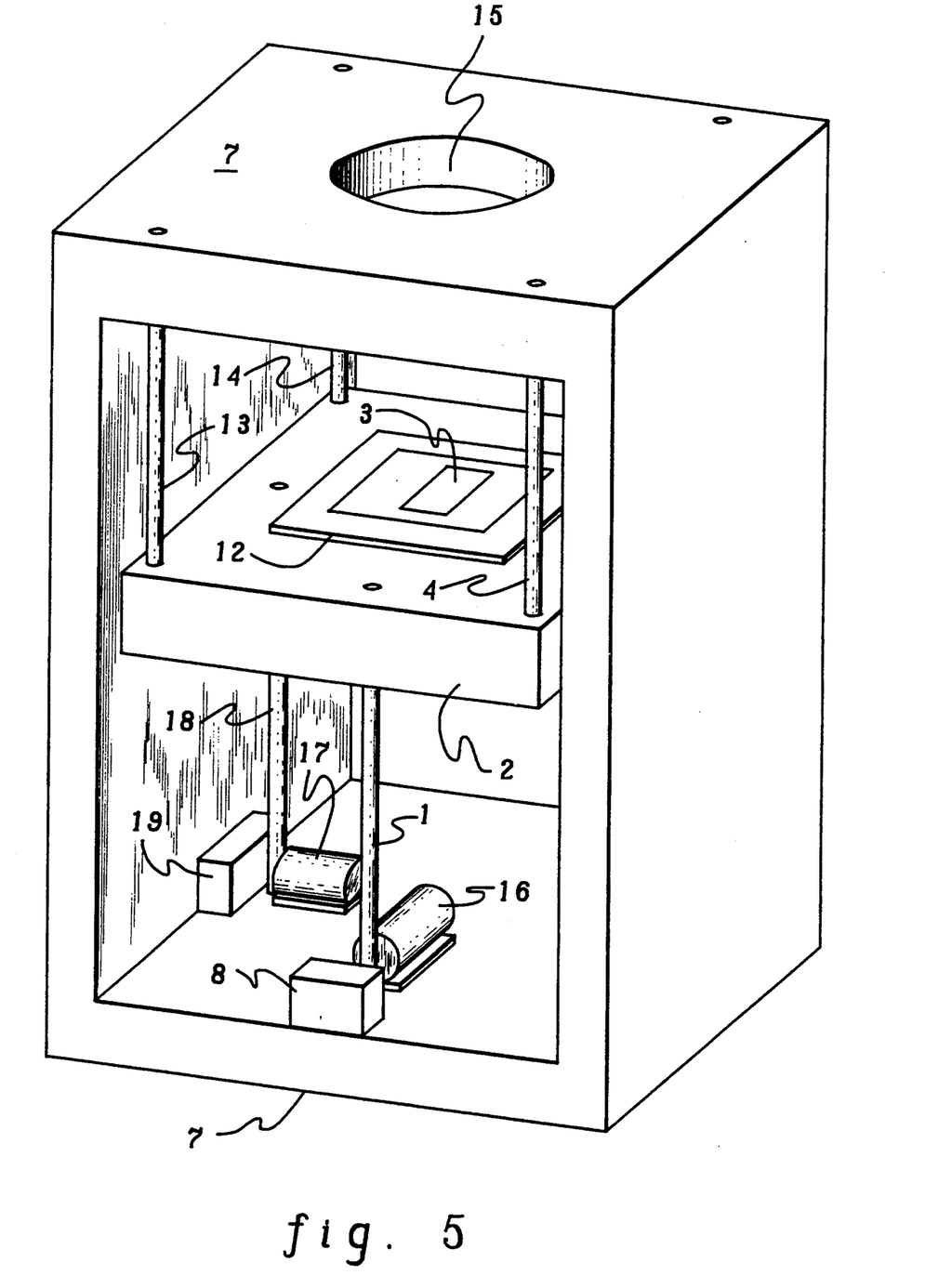
FIG. 5 is an oblique view of an alternate embodiment of the invention that produces displacement along two orthogonal axes.

FIG. 5 illustrates an alternative embodiment of the invention wherein the CCD 3 and its accompanying stage 12 are mounted on rigid frame member 2 and lens 15 is located on rigid frame member 7. Rigid frame 2 is connected to rigid frame 7 by four connecting beams 4, 5 (not visible) 13, and 14 which are fixedly mounted in both frames. Frame 2 is displaced with respect to frame 7 by the action of solenoids 16 and 17 on force transferring beams 1 and 18, respectively. In the embodiment illustrated, the force exerted by force-transferring beams 1 and 18 is controlled by stops 8 and 19 which very precisely limit the displacement of the force-transferring beams.

It will be noted from FIGS. 3–5 that the cross-sectional shape of the connecting beams and the force-transferring beams is not critical, nor is their composition. The beams may be made of any material that demonstrates elasticity in the sense of having a Young's modulus. Examples of such materials include metals such as steel, aluminum or brass, as well as wood, plastic and rubber. The nature of the connecting beams must, however, be such that the natural frequency of the system which includes the two rigid frames and the connecting beams is greater than 200 cycles per second. The diameter, length, number, and composition of the various beams can be modified to achieve the desired displacement of one frame with respect to the other.

Figure 6:
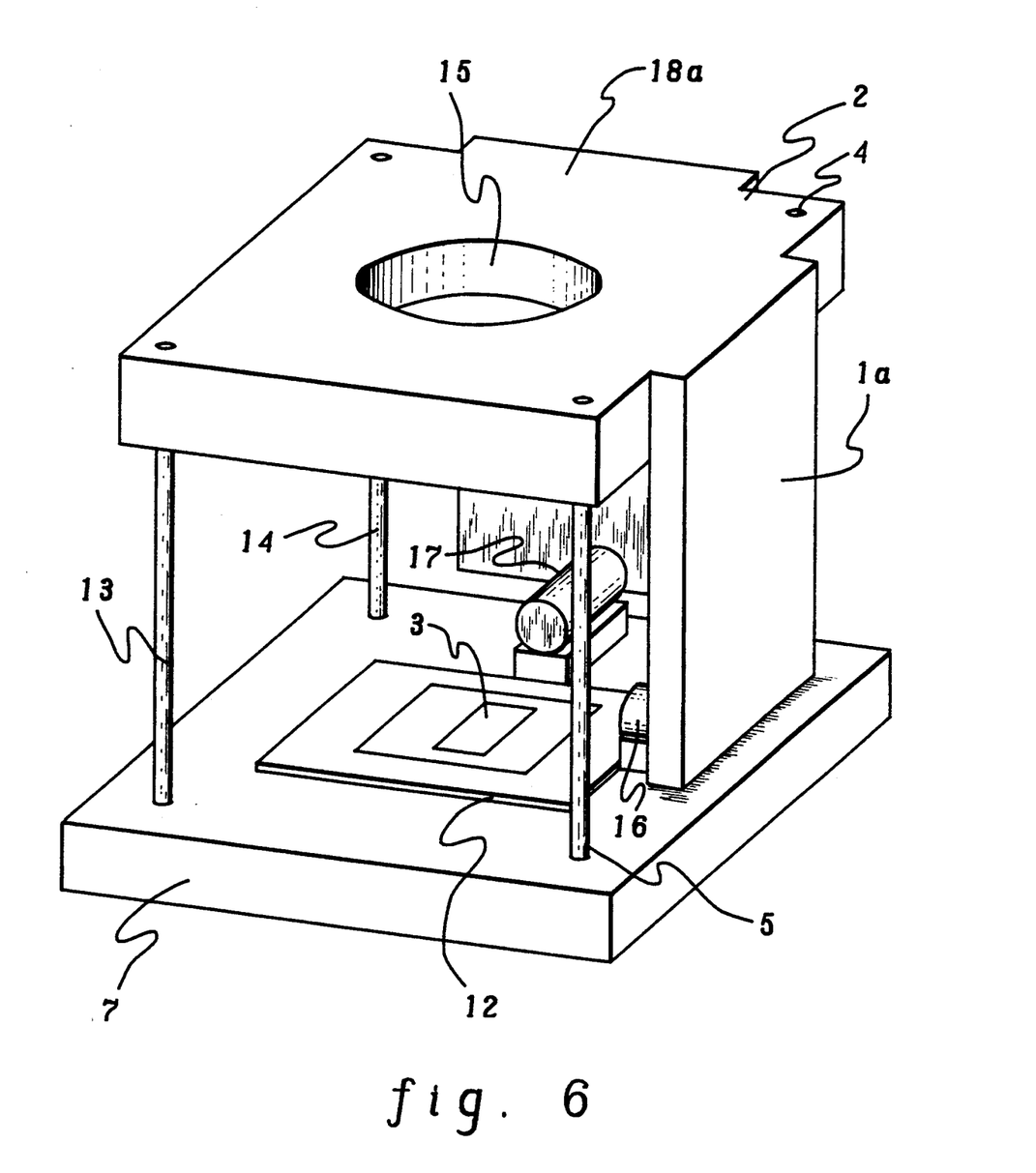
FIG. 6 is an oblique view of an embodiment of the invention that produces displacement along two orthogonal axes by direct action of solenoids on a rigid frame.

FIG. 6 extends the concept of force-transferring beams to the extreme wherein the stiffness of the force-transferring beam is sufficiently high (primarily due to its dimensions in this embodiment) that what had been a force-transferring beam now becomes a structural extension of the rigid frame 2. Thus extensions 1a and 18a function mechanically as integral parts of rigid frame 2 and solenoids 16 and 17, in effect, act directly on rigid frame 2. In this embodiment the displacement of the frame 2 relative to the frame 7 is controlled by the force exerted by the solenoids 16 and 17 acting in concert with the resistance provided by the connecting beams 4, 5, 13 and 14. The other elements in FIG. 6 are as defined in FIG. 3.

The displacement of the frames relative to each other is calculated in straightforward fashion from the formula for displacement of a cantilever beam:

$$S = \frac{WL^3}{3EI}$$

wherein S is the deflection, W is the force exerted by the force-transferring beam or by the solenoid, L is the length of the connecting beams, E is the Young's modulus of the material used to fabricate the connecting beams, and I is the moment of inertia of the connecting beams. The force that will be generated by a set displacement of a force-transferring beam can be calculated using the same formula and solving for force at a fixed deflection. In the case where there are four steel rods 2.54 cm long and 2.36 mm in diameter, a force of 4.45 newtons will cause a 5.1 $\mu$m relative displacement of the two rigid frames. That force of 4.45 newtons can be provided directly by a solenoid whose output is 4.45 newtons or by the 5 mm displacement of a steel force-transferring beam 10.16 cm long and 2.36 mm in diameter.

A solenoid-driven dither mechanism was built with a 40 ohm solenoid that produced about 4.45 newtons of force at one quarter amp. The power dissipation at this current was 2.5 watts. The CCD platform, the driver board and the CCD array together weighed about 454 g. The platform followed the design shown in FIG. 6; this system is free to move in any direction in the xy plane. The connecting beams 4, 5, 13 and 14 were 2.36 mm steel rods, 2.54 cm long; they were fixedly attached at both ends to frames 2 and 7. Together they had a stiffness of 9282 newtons/cm. The natural frequency of the system was 220 cycles per seconds, which is high enough to ensure system stability. Displacements of 5 micron ($\frac{1}{4}$ pixel pitch for a common array) have been produced consistently with less than 5% variation by simply controlling coil current. Kinematic constraint was not necessary to prevent motion orthogonal to the desired direction because the solenoids were placed symmetrically relative to the connecting beams. The rigid frame members were fashioned from 1.27 cm thick steel and were 12.6 cm long by 10.4 cm wide with extensions 1a and 18a that were 2.54 cm by 1.12 cm.

A second, similar solenoid-driven dither mechanism was built to the same dimensions as FIG. 6 using the design shown in FIG. 4. Solenoid 16 was energized to produce a displacement along the x axis and the (undesired) motion in the y axis was measured as shown in Table I. There was less than 5% displacement in an orthogonal axis from the activation of a single uni-directional solenoid.

TABLE I

| Voltage (v) | Current (A) | x-displacement ($\mu$m) | y-displacement ($\mu$m) |
| --- | --- | --- | --- |
| 10 | 0.5 | 4.06 | 0.127 |
| 12 | 0.6 | 4.32 | 0.254 |
| 13 | 0.7 | 4.82 | 0.254 |
| 14 | 0.7 | 5.84 | 0.254 |
| 16 | 0.8 | 6.35 | 0.254 |

Figure 7:
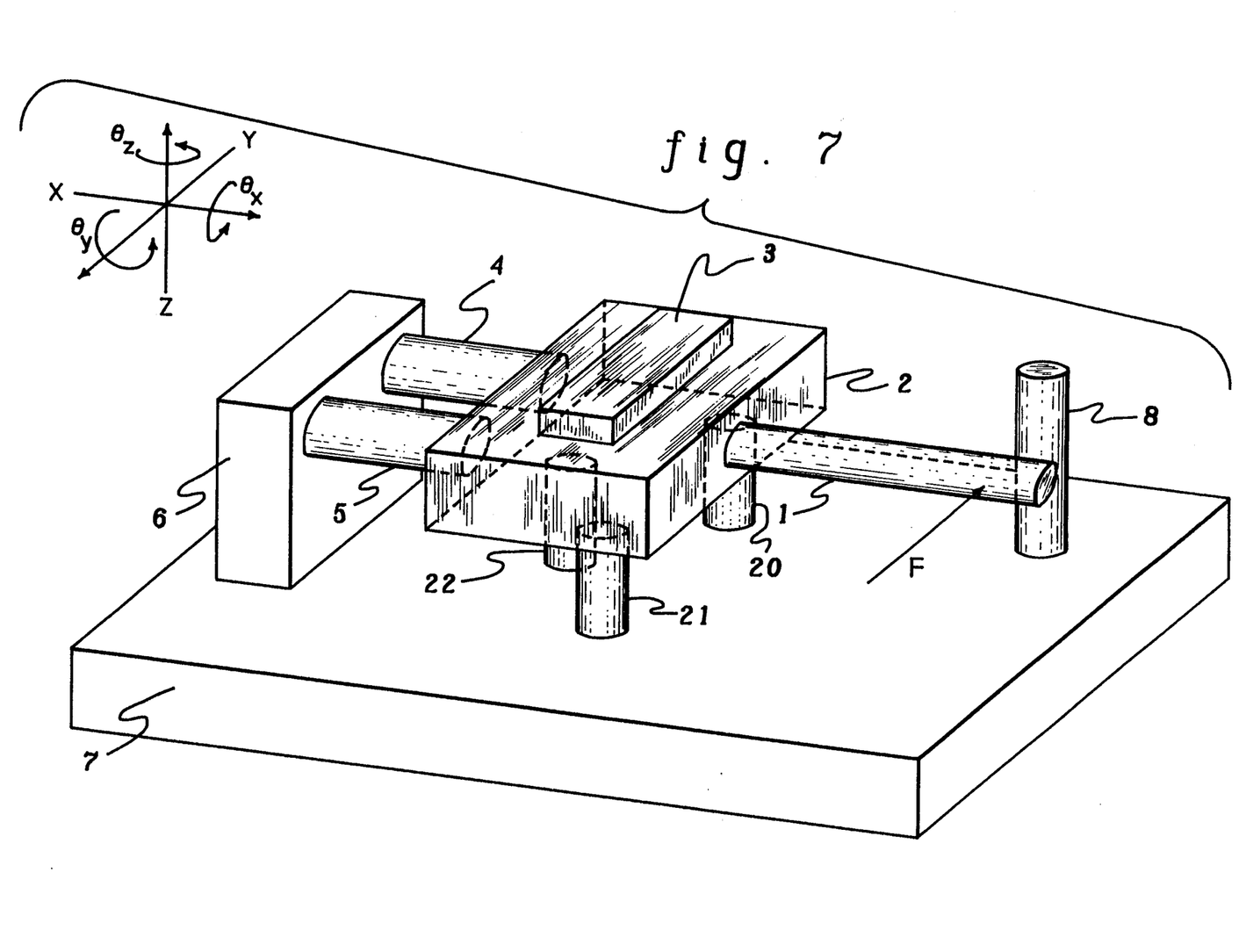
FIG. 7 is an oblique view of a simple device of the invention that limits displacement to a single axis, allowing no other motion.

A kinematically constrained design can be used if five percent crosstalk is not acceptable. This design constrains the relative motion between the plates to one axis and eliminates the crosstalk between axes. All possible relative displacements of two planar surfaces are described by six variables: x, y, z, $\theta$x, $\theta$y and $\theta$z as shown in FIG. 7. An example of a kinematic design is also shown in FIG. 7. Each flexure controls one degree of freedom; and in this case five degrees of freedom are controlled so the frame can move on only one axis. Beam 4 controls x, beam 5 controls $\theta$z, beam 20 controls z, beam 21 controls $\theta$x, and beam 22 controls $\theta$y; the frames can move only in the y-axis. (The other elements are as defined in FIG. 2.) Motion along additional axes, orthogonal or otherwise, can be obtained by stacking similar single-axis mechanisms. The mechanism shown represents the basic kinematic design. Other embodiments are possible based on similar principles.

In the preferred embodiment illustrated in FIGS. 3, 4, 5, and 6, the drive solenoids 16 and 17 are activated in a sequence that causes the frame 2 to move in a rectangular or square pattern. Each pixel of an image sensor 3 located on the circuit board 12 can be activated to capture a plurality of different image points preferably one at each corner of the rectangle or square. These are then combined into a single image with twice the resolution in both x and y directions. Thus, an inexpensive low resolution sensor mounted on the circuit board can be used to generate a higher resolution image.

Simplicity is the main advantage of the stiff beam dither mechanism. A current control power supply and a solenoid are all that are required. The drift and complicated power supply associated with piezoelectric actuators are avoided, and the system is inherently stable, unlike a low stiffness mounting. In addition, the stiff beam dither mechanism is not substantially affected by external forces such as vibration or by turning the system on its side. The image may be offset a few pixels when turned on its side but it will still be dithered by one pixel. If the low stiffness beam is used to actuate the dither mechanism any mechanical means of moving the beam to a stop may be used. A simple gear, ratchet, or cam or a simple power line operated solenoid may be used.

While the invention has been particularly shown and described with reference to preferred embodiments thereof, it will be understood by those skilled in the art that other changes in form and details may be made therein without departing from the spirit and scope of the invention.

I claim:

1. An apparatus for imparting a controlled relative displacement of two parallel surfaces in an electro-optical detector system comprising:
    (a) first and second rigid frames having opposing parallel faces, wherein said parallel face of said first rigid frame carries one of an image source and a photosensitive matrix and said opposing parallel face of said second rigid frame carries the other of said image source and said photosensitive matrix;
    (b) a plurality of parallel connecting beams connecting said first and second rigid frames, the ends of said beams being fixedly attached to said frames, said beams having a stiffness such that a natural frequency of oscillation of a system comprising said beams and said frames is greater than 200 cps;
    (c) a force-transferring beam substantially parallel to said connecting beams having a first end fixedly attached to said first rigid frame, said force transferring beam having a smaller stiffness than the sum of the stiffness of said connecting beams; and
    (d) means for applying sufficient force to said second end of said force-transferring beam to cause a displacement of said second end from a position of rest, said means fixedly attached to said second rigid frame and engaging a second end of said force-transferring beam wherein the resistance to deflection of said force-transferring beam and said connecting beams act in concert to produce a relative displacement of said first and second rigid frames substantially along a single axis.

2. An apparatus according to claim 1 wherein said image source is a lens and said photosensitive matrix is a CCD array.

3. An apparatus according to claim 2 having two parallel connecting beams.

4. An apparatus according to claim 3 wherein said means for applying force is a solenoid.

5. An apparatus according to claim 3 wherein said means for applying force is a cam.

6. An apparatus for imparting a controlled relative displacement of two parallel surfaces in an electro-optical detector system comprising:
    (a) first and second rigid frames having opposing parallel faces, wherein said parallel face of said first rigid frame carries one of an image source and a photosensitive matrix and said opposing parallel face of said second rigid frame carries the other of said image source and said photosensitive matrix;
    (b) a plurality of parallel connecting beams connecting said first and second rigid frames, the ends of said beams being fixedly attached to said frames, said beams having a stiffness such that a natural frequency of oscillation of a system comprising said beams and said frames is greater than 200 cps;
    (c) first and second force-transferring beams substantially parallel to said connecting beams, each force-transferring beam having a first end fixedly attached to said first rigid frame, and each force-transferring beam having a smaller stiffness than the sum of the stiffness of said connecting beams; and
    (d) means for applying sufficient force to said second ends of said force-transferring beams to cause displacements of said second ends from a position of rest, said means fixedly attached to said second rigid frame and engaging a second end of each of said force-transferring beams wherein the resistance to deflection of said force-transferring beams and said connecting beams act in concert to produce a relative displacement of said first and second rigid frames substantially along two orthogonal axes.

7. An apparatus according to claim 6 having four parallel connecting beams.

8. An apparatus according to claim 7 wherein said first rigid frame carries a lens and said second rigid frame carries a CCD array.

9. An apparatus according to claim 8 wherein said means for applying force are a pair of solenoids.

10. An apparatus according to claim 8 wherein said means for applying force are a pair of cams.

11. An apparatus according to claim 7 wherein said first rigid frame carries a CCD array and said second rigid frame carries a lens.

12. An apparatus according to claim 11 wherein said means for applying force are a pair of 13. An apparatus according to claim 11 wherein said means for applying force are a pair of cams.

14. An apparatus for imparting a controlled relative displacement of two parallel surfaces in an electro-optical detector system comprising:
    (a) first and second rigid frames having opposing parallel faces, wherein said parallel face of said first rigid frame carries one of an image source and a photosensitive matrix and said opposing parallel face of said second rigid frame carries the other of said image source and said photosensitive matrix;
    (b) a plurality of parallel connecting beams connecting said first and second rigid frames, the ends of said beams being fixedly attached to said frames, said beams having a stiffness such that a natural frequency of oscillation of a system comprising said beams and said frames is greater than 200 cps;

(c) a pair of solenoids orthogonally mounted on said second rigid frame for applying sufficient force to said first rigid frame to cause a displacement of said first frame from a position of rest, said solenoids fixedly attached to said second rigid frame and engaging two orthogonal surfaces of said first rigid frame wherein the resistance to deflection of said connecting beams and the force provided by said solenoids act in concert to produce a controlled, relative displacement of said first and second rigid frames substantially along two orthogonal axes.

15. An apparatus according to claim 14 wherein said first rigid frame carries a CCD array, said second rigid frame carries a lens, and said frames are connected by four connecting beams.

16. An apparatus according to claim 14 wherein said first rigid frame carries a lens, second rigid frame carries a CCD array, and said frames are connected by four connecting beams.

17. A method for the generation of electronic picture information, comprising:
   (a) providing a charge-coupled detector having a plurality of rectangular detector elements having first and second sides, said detector elements being arranged in columns parallel to said first sides and rows parallel to said second sides; the detector elements of each of said columns defining first interstices therebetween; the detector elements of each of said rows defining second interstices therebetween;
   (b) providing imaging means for forming an image of a field of view on said detector whereby each of said detector elements provides picture information;
   (c) providing an apparatus comprising:
      (1) first and second rigid frames having opposing parallel faces, wherein said parallel face of said first rigid frame carries one of an image source and a photosensitive matrix and said opposing parallel face of said second rigid frame carries the other of said image source and said photosensitive matrix;
      (2) a plurality of parallel connecting beams connecting said first and second rigid frames, the ends of said beams being fixedly attached to said frames, said beams having a stiffness such that a natural frequency of oscillation of a system comprising said beams and said frames is greater than 200 cps;
      (3) first and second force-transferring beams substantially parallel to said connecting beams, each force-transferring beam having a first end fixedly attached to said first rigid frame, and each force-transferring beam having a smaller stiffness than the sum of the stiffness of said connecting beams; and
      (4) means for applying sufficient force to said second ends of said force-transferring beams to cause displacements of said second ends from a position of rest, said means fixedly attached to said second rigid frame and engaging a second end of each of said force-transferring beams wherein the resistance to deflection of said force-transferring beams act in concert to produce a relative displacement of said first and second rigid frames substantially along two orthogonal axes;
   (d) displacing said image relative to said detector such that at some point during each cycle each point of said image that has fallen on an interstice is directed onto a detector element.

18. A method for the generation of electronic picture information, comprising:
   (a) providing a charge-coupled detector having a plurality of rectangular detector elements having first and second sides, said detector elements being arranged in columns parallel to said first sides and rows parallel to said second sides; the detector elements of each of said columns defining first interstices therebetween; the widths of said interstices being substantially equal to the lengths of said first sides; the detector elements of each of said rows defining second interstices therebetween, the widths of said second interstices being substantially equal to the length of said second sides;
   (b) providing imaging means for forming an image of a field of view on said detector whereby each of said detector elements provides picture information;
   (c) providing an apparatus for imparting a controlled relative displacement of two parallel surfaces in an electro-optical detector system comprising:
      (1) first and second rigid frames having opposing parallel faces, wherein said parallel face of said first rigid frame carries one of an image source and a photosensitive matrix and said opposing parallel face of said second rigid frame carries the other of said image source and said photosensitive matrix;
      (2) a plurality of parallel connecting beams connecting said first and second rigid frames, the ends of said beams being fixedly attached to said frames, said beams having a stiffness such that a natural frequency of oscillation of a system comprising said beams and said frames is greater than 200 cps;
      (3) first and second force-transferring beams substantially parallel to said connecting beams, each force-transferring beam having a first end fixedly attached to said first rigid frame, and each force-transferring beam having a smaller stiffness than the sum of the stiffness of said connecting beams; and
      (4) means for applying sufficient force to said second ends of said force-transferring beams to cause displacements of said second ends from a position of rest, said means fixedly attached to said second rigid frame and engaging a second end of each of said force-transferring beams wherein the resistance to deflection of said force-transferring beams act in concert to produce a relative displacement of said first and second rigid frames substantially along two orthogonal axes;
   (d) displacing said image along a closed rectangular trajectory, said apparatus displacing each point of said image relative to said detector, during each cycle, from one corner of a rectangle, the sides of which are equal and parallel to said first and second sides, to an adjacent corner.

19. A method for the generation of electronic picture information, comprising:
   (a) providing a charge-coupled detector having a plurality of rectangular detector elements having first and second sides, said detector elements being arranged in columns parallel to said first sides and rows parallel to said second sides; the detector elements of each of said columns defining first interstices therebetween, the widths of said interstices being substantially equal to the lengths of said first sides; the detector elements of each of said rows defining second interstices therebetween, the widths of said second interstices being substantially equal to the length of said second sides;

(b) providing imaging means for forming an image of a field of view on said detector whereby each of said detector elements provides picture information;

(c) providing an apparatus comprising:
  (1) first and second rigid frames having opposing parallel faces, wherein said parallel face of said first rigid frame carries one of an image source and a photosensitive matrix and said opposing parallel face of said second rigid frame carries the other of said image source and said photosensitive matrix;
  (2) a plurality of parallel connecting beams connecting said first and second rigid frames, the ends of said beams being fixedly attached to said frames, said beams having a stiffness such that a natural frequency of oscillation of a system comprising said beams and said frames is greater than 200 cps;
  (3) a pair of solenoids orthogonally mounted on said second rigid frame for applying sufficient force to said first rigid frame to cause a displacement of said first frame from a position of rest, said solenoids fixedly attached to said second rigid frame and engaging two orthogonal surfaces of said first rigid frame wherein the resistance to deflection of said connecting beams and the force provided by said solenoids act in concert to produce a controlled, relative displacement of said first and second rigid frames substantially along two orthogonal axes;

(d) displacing said image along a closed rectangular trajectory, said apparatus displacing each point of said image relative to said detector, during each cycle, from one corner of a rectangle, the sides of which are equal and parallel to said first and second sides, to an adjacent corner.

* * * * *